United States Patent

Petersen

[15] 3,643,439
[45] Feb. 22, 1972

[54] COMPOUND REACTION PROPULSION MEANS WITH MULTIPLE THRUST

[72] Inventor: Adolphe C. Petersen, 4623 Bruce Avenue, S.E., Minneapolis, Minn. 55424

[22] Filed: Nov. 29, 1968

[21] Appl. No.: 779,999

[52] U.S. Cl. ................................60/225, 60/226, 60/228, 60/267, 60/270, 60/36, 60/39.31
[51] Int. Cl. ................F02c 7/20, F02k 11/00, F01k 25/00
[58] Field of Search ....................60/36, 38, 39.18 B, 39.18, 60/224, 225, 261, 267, 270, 39.31, 228, 226

[56] References Cited

UNITED STATES PATENTS

| | | | |
|---|---|---|---|
| 1,734,251 | 11/1929 | Gallet | 244/52 |
| 2,403,353 | 7/1946 | Ernest | 244/56 |
| 2,820,599 | 1/1958 | Ackeret et al. | 60/224 X |
| 2,955,422 | 10/1960 | Peterson | 60/39.18 B |
| 3,007,306 | 11/1961 | Martin et al. | 60/38 |
| 3,054,577 | 9/1962 | Wolf et al. | 60/224 X |
| 3,172,253 | 3/1965 | Schelp | 60/267 X |
| 3,241,310 | 3/1966 | Hoadley | 60/267 |
| 2,586,025 | 2/1952 | Godfrey | 60/267 |
| 3,103,102 | 9/1963 | Sargent et al. | 60/224 |
| 3,146,584 | 9/1964 | Smith et al. | 60/39.31 X |
| 3,149,461 | 9/1964 | Eichholtz | 60/225 |
| 3,442,082 | 5/1969 | Peterson | 60/224 |

FOREIGN PATENTS OR APPLICATIONS

| | | | |
|---|---|---|---|
| 877,383 | 5/1953 | Germany | 60/267 |
| 1,077,919 | 3/1960 | Germany | 60/224 |

*Primary Examiner*—Al Lawrence Smith

[57] ABSTRACT

This power propulsion system involves compound reaction thrust for propulsion, and including supplementary air propulsion by supplementary propelled airstream impulse, and including pressurized heated work fluid driving supplementary air propulsion and including work fluid container means for heat absorption.

7 Claims, 9 Drawing Figures

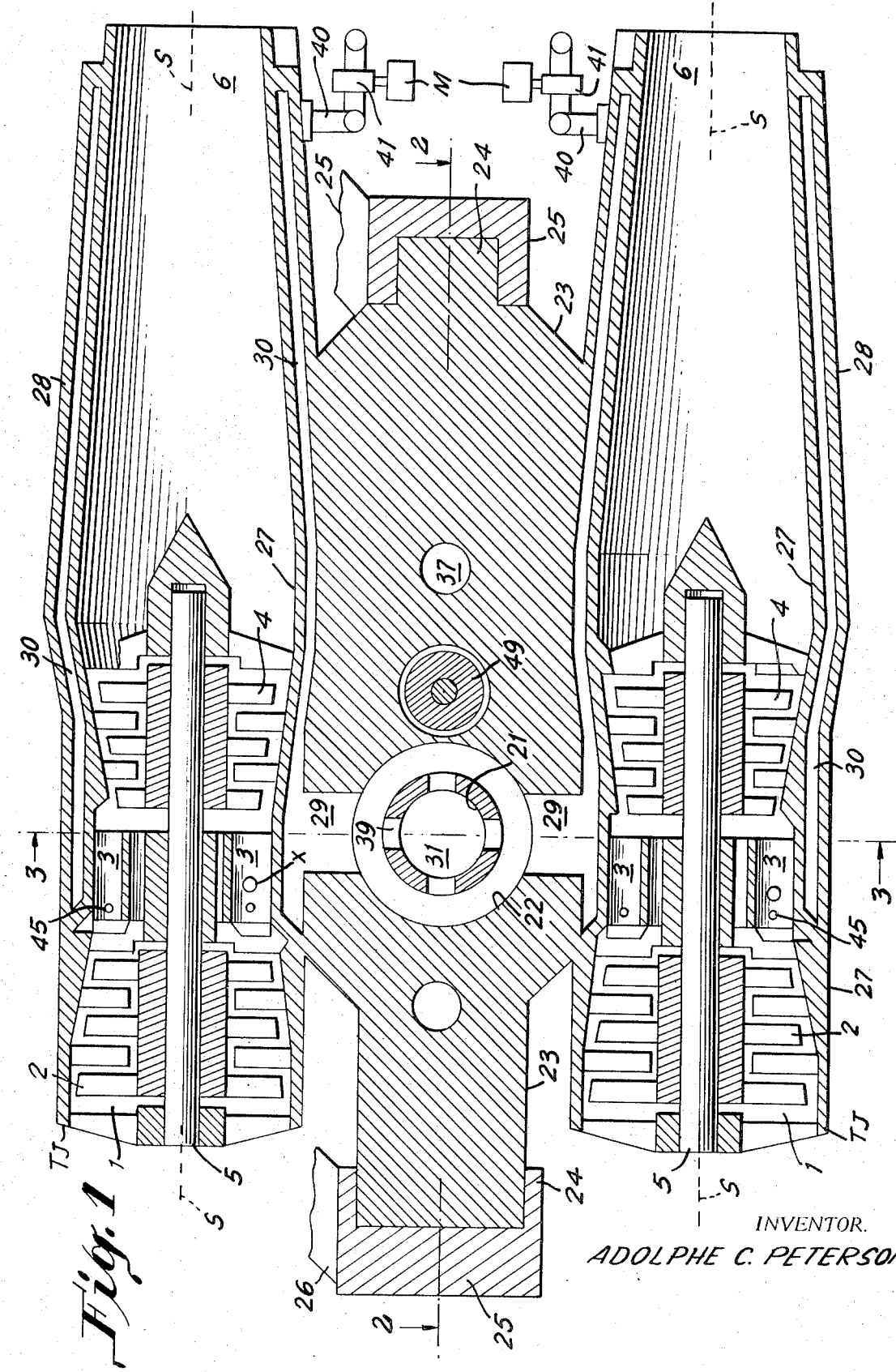

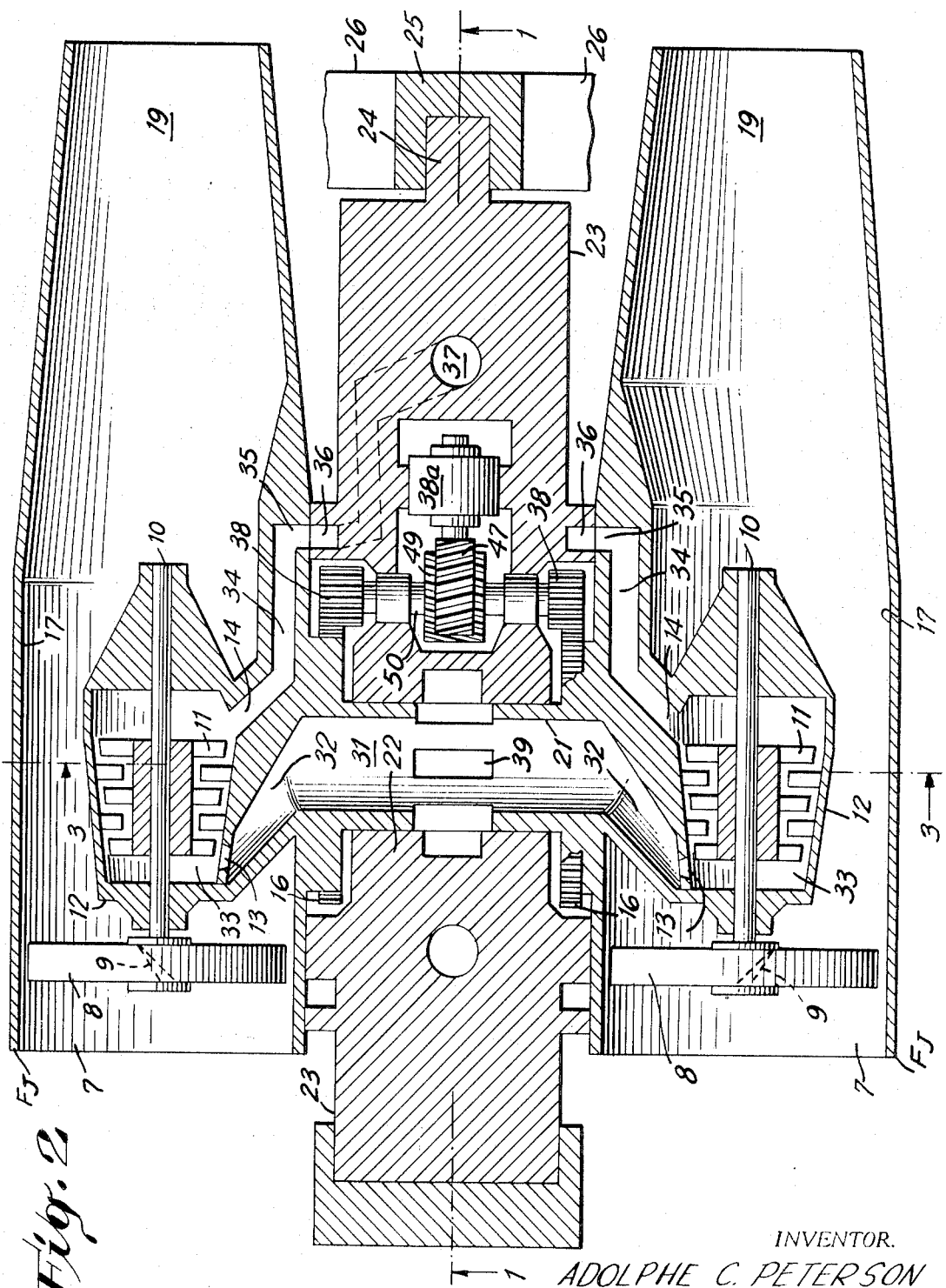

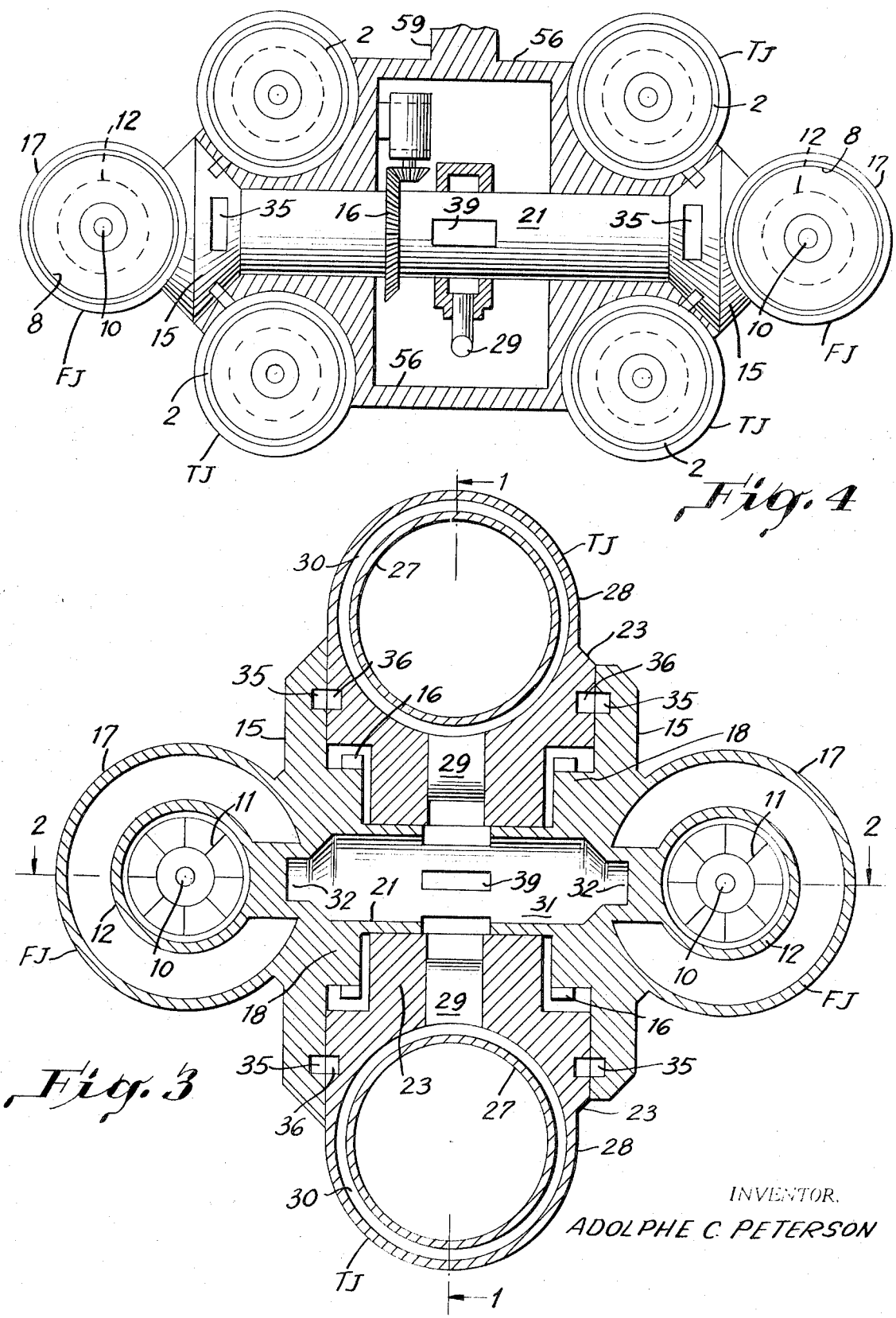

INVENTOR.
ADOLPHE C. PETERSON

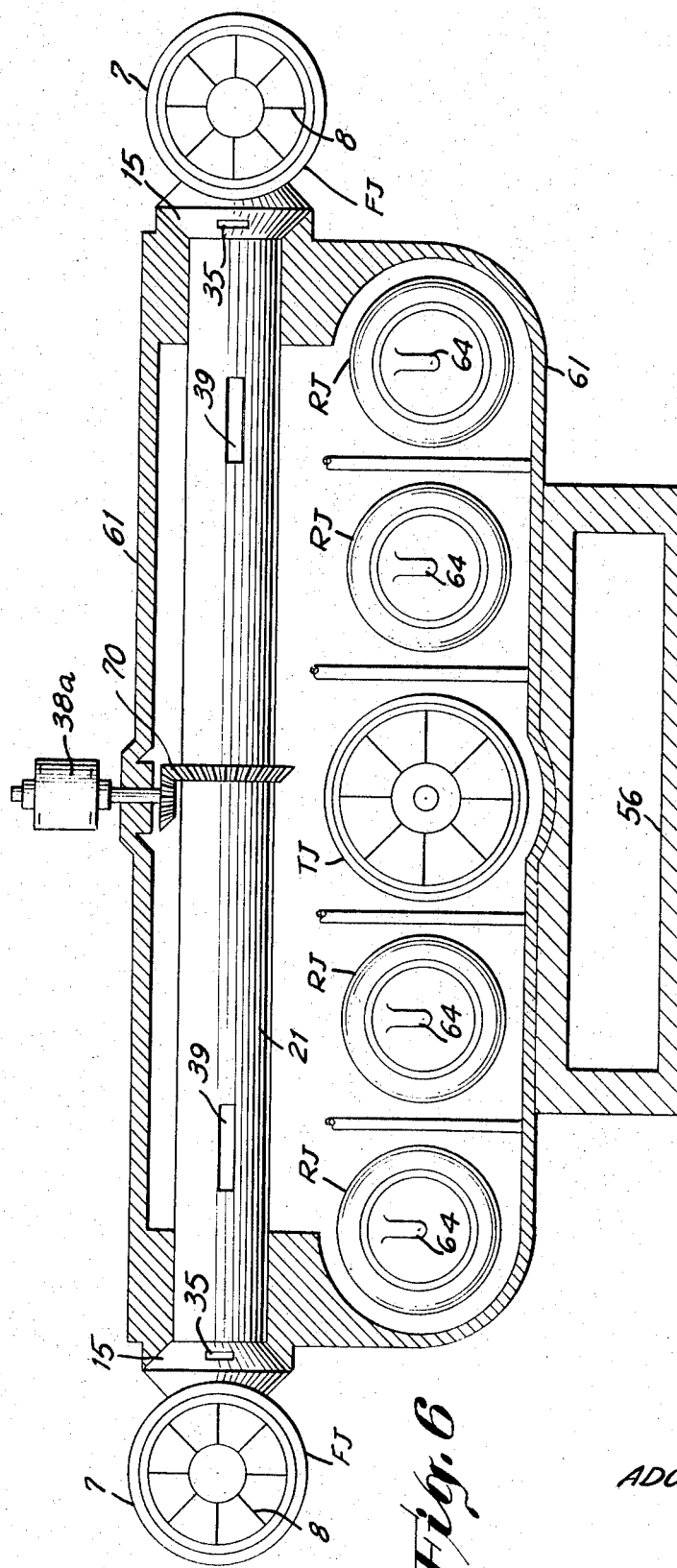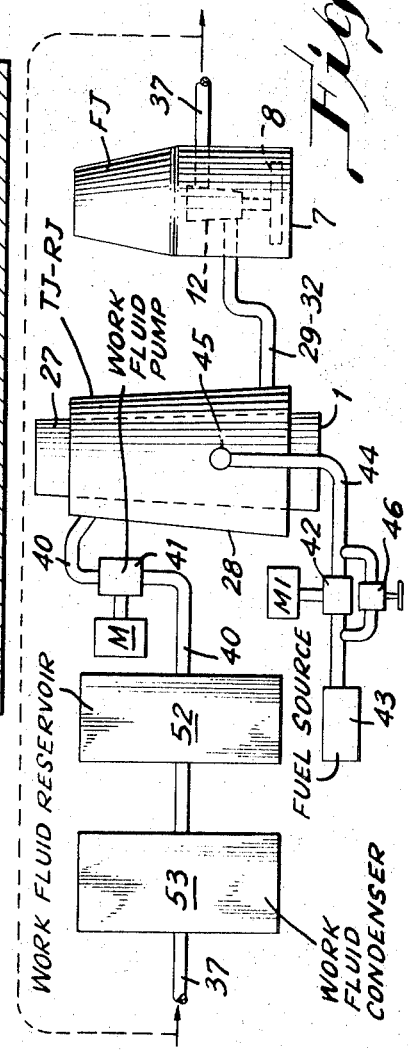

3,643,439

COMPOUND REACTION PROPULSION MEANS WITH MULTIPLE THRUST

My invention relates to propulsion means for vehicles and especially for vehicles which are designated as aircraft of any type such as are commonly in use, and this invention is called "Compound Reaction Propulsion Means with Multiple Thrust."

The chief objective of my invention is the provision of a variable system of propulsion for aircraft, which system of propulsion will due to its nature result in advantages such as improvement in the use of fuel for propulsion, improvement in the uses for propulsion in aircraft such as adaptation of propulsive power to sustentation for the aircraft so that there may be less necessity for use of other means for aircraft sustentation by the wing structure of an aircraft, especially in takeoff from the landing fields or carrier decks, and for the landing of aircraft on landing fields or on carrier decks, or other decks such as building roof decks.

One objective of the invention is the use of a dual method of application of the heat generated in turbojet systems or in other systems such as ramjet systems, for propulsion, and thereby the possibility of more economical use of the fuel for propulsion.

Another objective and an especial objective is the provision of a means and method by which the propulsion discharge and power may be utilized by variable direction impulse so that the propulsive power of the system may be used not only for travel propulsion in the generally horizontal direction, but so that the propulsive power may also be used for auxiliary sustentation effect whereby wing sustentation may be supplemented by this propulsive change of direction of the propulsion means and so that this ability may be used for sustentation ability not only as a supplement when landing or takeoff, but may be used also in travel or cruising of the aircraft, or in some cases for full sustentation.

Another objective of this system is the provision of a system of power production which may more fully and economically use the fuel for propulsion but which system may provide propulsion in a manner which may be more durable and less liable to failure and damage in flight and may be used with somewhat less cost of construction and cost of maintenance in use. An objective is therefore provision of power production and propulsion in a means which may result in greater safety of passengers and crew in flight for long distances, especially. It is especially an objective that the use of this system may result in aircraft use with less production of noise, especially in the high-speed or supersonic speed type of aircraft, so that takeoff and landings may be made at airports with less degree of noise nuisance to residents and people generally in areas near airports and commercial centers.

In general the object is improvement of propulsion and sustentation for aircraft of various classes, such as military or commercial aircraft, aircraft such as helicopters, supersonic travel aircraft, or aircraft for private personal use.

In the accompanying drawings which illustrate my invention in several different forms, like characters refer to like parts in the several forms, in so far as is practicable. Referring to the drawings:

FIG. 1, 2, 3, show one form of propulsion unit which is a part of my propulsion system, FIG. 1 being a vertical section on a vertical plane on lines 1—1 of FIGS. 2 and 3; FIG. 2 being a horizontal section on lines 2—2 of FIGS. 1 and 3; FIG. 3 being a vertical section on lines 3—3 of FIGS. 1 and 2; some parts being shown in plan or elevation views.

FIG. 4 is a view of a slightly modified mounting for elements of the unit of the same general type as shown in FIGS. 1, 2, 3, FIGS. 5 and 6 are views of a modified form of the system of propulsion, FIG. 5 being a plan view of the unit, FIG. 6 being a vertical section on the line 6—6 of FIG. 5, some elements being in side elevation.

FIG. 8 shows diagrammatically the general flow of work fluid and also the flow of combustion fuel and is contemplated to show this generally as applied to either single or multiple number combustion conduits of either kind.

Figure 5:
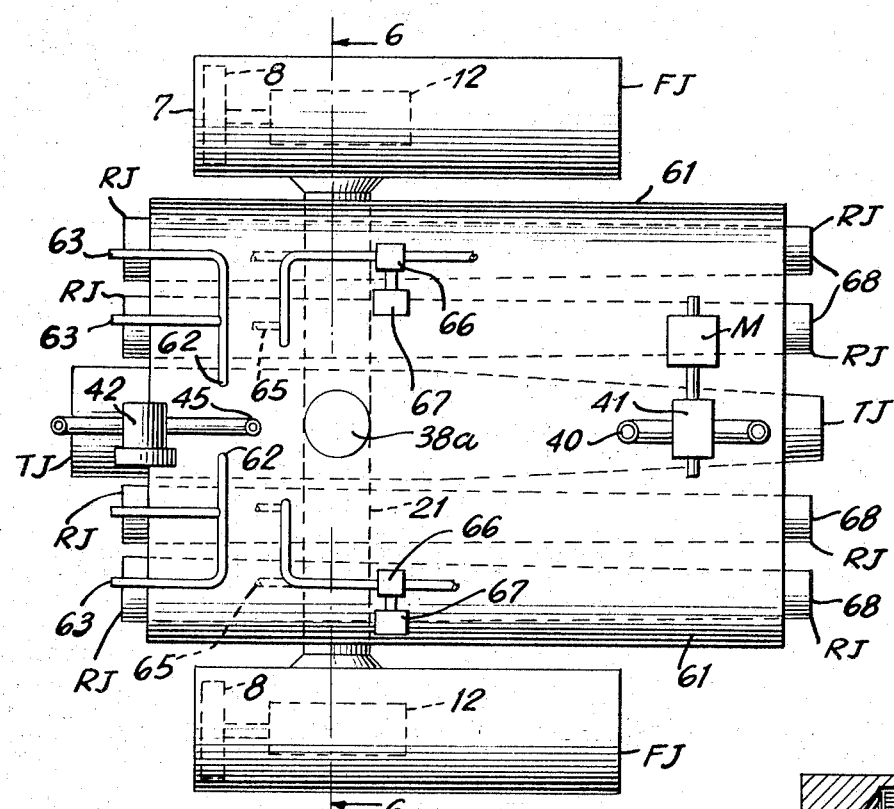
Figure 9:
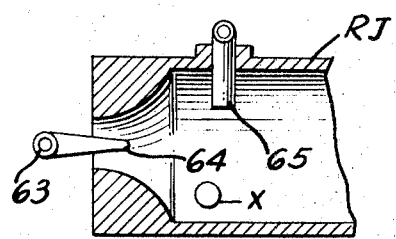
FIG. 9 is a partial figure showing the front end of one of the ramjets, to show particularly the air and fuel nozzles delivering to the ramjet duct illustrated.

The propulsion system is of two general types, one, FIGS. 1,2,3, being of a system depending in part on the turbine-jet form of propulsion, and the other being of a system depending in part on the ramjet type of propulsion. These two different types of propulsion are used in the system of propulsion in combination with, as a part of the system for propulsion, another form of energy utilization for propulsion, there being, in each type of propulsion system, accordingly, a total energy propulsion resulting from the combination, which is as great as the sum of the energy of one propulsion plus the energy of the other propulsion. This combination results in production of propulsive power for an aircraft embodying the combination which power is very effective especially for the very large and economical aircraft which may travel at travel speed such as high supersonic speed, or may travel at speeds below but near supersonic speed.

Referring now especially to figures 1,2,3, the unit there shown is composed of four jet propulsion tubes which are the chief operative means, and two of these are turbine-jets each designated as TJ, and two of these jet-propulsion tubes are air-fan jets each designated as FJ. The two first named are producers of propulsion jets by gas turbine means and each of these have air intakes 1, air compressors 2 preferably of the multistage type as shown, combustion chambers 3 preferably of the annular type, bladed turbine rotors 4, turbine shafts 5 each connecting a turbine with a compressor, jet discharges 6.

The two jet propulsion tubes, second mentioned above, which are air-fan jets FJ, each have air intakes 7, air-fans 8 which may be shrouded air-fans as shown, or any other kind fan blades having air blades 9, driving shafts 10, turbine rotor means 11, turbine casings 12, volatile fluid inlets 13, volatile fluid exhausts 14, valve members 15, large spur gears 16 fixed on the air-fan tube casings 17 by means of the drum parts 18 formed on the casings 17 at their sides, air jet discharges 19 formed at the discharge ends of the air-fan casings 17. The air-fans 8 are driven through the shafts 10, each air-fan 8 by its associated turbine-rotor means 11.

The two casings 17 of the air-fan jets FJ are fixed, each at one of its sides, by one of the valve members 15 and its drum part 18 associated, to an adjacent end of a tubular mounting shaft means 21, the latter being a strong and firm cylindrical member so formed that it is in and is rotatable in a firm bearing 22 of relatively considerable length, the bearing 22 being formed as a part of or by any additional bearing material mounted and fixed in the unit mounting structure designated in entirety as 23, this mounting structure having at its forward and rearward ends, mounting blocks 24. The mounting blocks 24 are especially strong so that they may serve as a mounting base, as it may be otherwise designated, and each is in mounting of the unit on an aircraft, fitted into and firmly secured each in one of extension structures 25, each latter structure having two arms 26 which may be extended from the aircraft frame structure, as indicated in FIG. 2.

The two turbine-jets TJ are mounted and firmly fixed on the mounting structure 23, one on the upper side thereof and the other on the underside thereof, the turbine jets TJ being by their turbine casings 27 and their tubular generator shells 28 (one as to each TJ) fixed on the mounting structure 23. The turbine-jets are as such means fixed to be static on as an affixed part of the mounting structure 23 and thus do not have any adjustment movement relative to the mounting structure 23. The generator shells 28 are formed as cylindrical shells about the turbine casings 27 and the jet tube extensions of the discharge outlet from the turbine casings 27, and the shells and turbine casings and discharges or tubes being formed so that the space between a shell and turbine casing is a space closed at each end and thereby will contain a volatile fluid without leakage therefrom except by the two volatile fluid outlet ports 29, one from each shell space 30, the ports 29 thus providing passage for fluid from spaces 30, each to the interior tubular space 31 interiorly of the mounting shaft to which the air-fan units are fixed one at each end. The space 31 of the mounting shaft discharges the volatile fluid by the extension passages 32 to the inlet chambers 33, one in each of the turbines which drive the air-fans. The volatile fluid passing to each air-fan turbine flows through the associate one of the turbine rotors 11 driving it and then flows by means of an exhaust passage 34 to an annular port 35 in the valve member associated and thereby to the exhaust passages 36 one from each air-fan turbine 11, and the exhaust passages 36 permit flow of the exhaust fluid by the common conduit 37 and thereby to a condenser means, as hereinafter described.

The large spur gears 16, being fixed with the mounting shaft means 21, provide means by which an electric motor or other motor means (such as hydraulic) (controlled in any manner) designated 38a may by small gears 38 transmit driving torque in either direction to the large spur gears 16, thereby to mounting shaft means 21 and thereby to air-fan casings 17 and the elements of the air-fan drive means. The motor means, of any kind, is a controllable and reversible motor drive to the spur gears and the mounting shaft means 21. The mounting shaft means 21 has midway of its length and intermediately thereof a number of shaft ports 39 which permit flow of the volatile fluid from the passages or ports between it (in the mounting structure) and the generator space within the shell spaces, above designated. The shell spaces at their ends most remote from the mounting shaft, i.e., at the rearward ends of the turbine jets, have communication with and passage therethrough of liquid volatile fluid delivered by the pipes 40 which are supplied with the liquid volatile fluid by means of pumps 41 which may be driven by electric or other motor means or driving means M, such means such as may be controlled to supply the desired or required volumetric flow of the liquid volatile fluid from a source thereof or condenser thereof, as hereinafter described. See FIG. 8 diagram.

A fuel pump means 42 as driven by a motor means MI of a controllable type receives fuel from a source 43 and delivers the fuel by conduits 44 to fuel nozzles 45 located to spray the liquid fuel into the combustion chambers 3 of the two turbine jets TJ. This fuel delivery is controllable by means of fuel bypasses 46. Preferably there is one controllable fuel supply to each of the two turbine jets TJ. Ignition means (not shown) as customarily used in turbine jets is supplied by electric generator means and spark plugs X or other means in lieu thereof.

The turbine jets TJ will be supplied with the usual starting means or any kind of starting means as is customary in turbine engine units and is well known, such means being not shown in the drawings. The motor means which imparts adjusting motivation to the mounting shaft and thereby to the air-fan jets FJ will in any installation be supplied with any type of remote control means for the motor means so that the associated air-fan means may be placed in any of its positions for the jet ejection, so that the ejection impulse from the air-fan jets FJ may be directed for direct rearward ejection or for ejection at any angle to the horizontal rearward ejection as for direct vertically downward ejection.

The motor means for adjustment of the rotation position of the mounting shaft means 21 by large spur gears 16 through small gears 38 and motor 38a drives the mounting shaft means, through as many degrees of a rotation for a selected static position, by means of a worm 47, worm wheel 49, and shaft 50 on which small gears 38 are fixed, and this large speed reduction together with the small angularity of the drive between worm and worm wheel results in a large holding strength and power when the motor drive is ineffective, so that the mounting shaft means and the air-fan units are securely held in a selected position for a selected ejection effect, so that such position and effect are maintained until a pilot or operator by the control provided desires a readjustment to a selected new position for ejection. It is contemplated that any other or additional position holding means for the mounting shaft means and the air-fan units may be provided in any construction, as may be necessary or advisable.

The shell space 30 (FIGS. 1 and 3) in operation will receive volatile fluid in a liquid or semiliquid state by means of fluid conduits 40 which deliver the fluid from reservoir 52 and under the pressure which may have been determined for the construction. The reservoir 52 and a fluid condenser means 53 (FIG. 8) contain the supply of fluid and the pump or pumps 41 operated by motors M (controllable variable speed motors) maintain the necessary pressure which may be preferably at least several hundred pounds per square inch and as high as may be determined to be satisfactory pressure for economy of construction and operation, and the fluid under such pressure is continuously delivered as necessary and appropriate, under the control provided, for efficiency.

The fluid provided for the shell space 30 of each turbine jet will be a volatile fluid such as may be expanded by heat and which may also be condensable (preferably) and this fluid may be water ($H_2O$) in relatively pure state, or it may be such a liquid as Freon (any of its kinds) or other gas or liquid which can be maintainable on an aircraft without unnecessary hazard.

Figure 7:
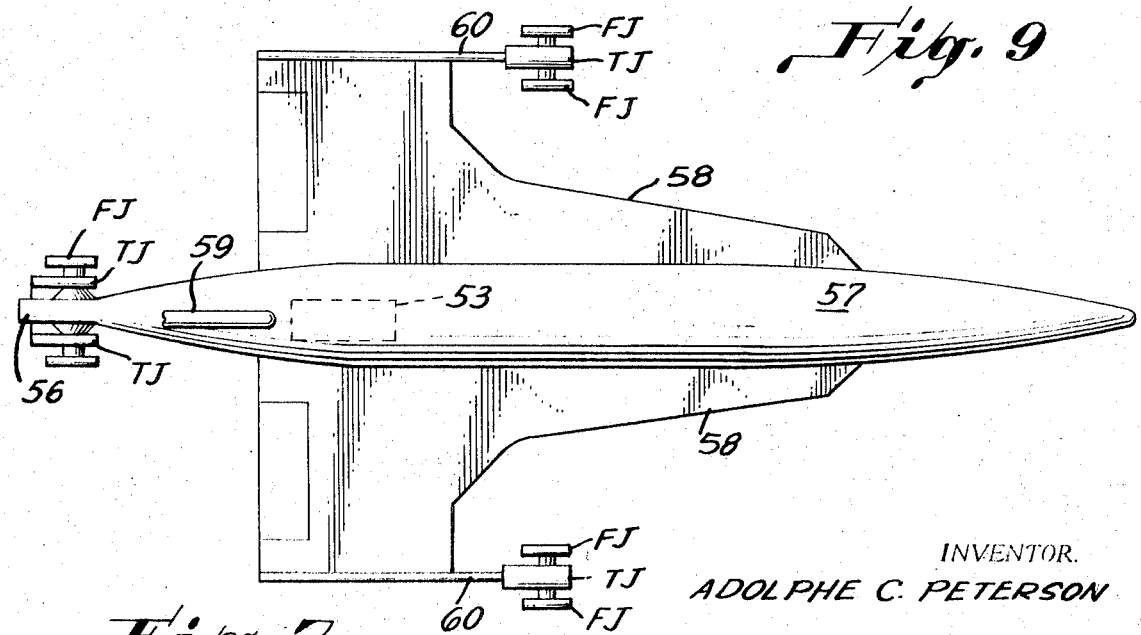
FIG. 7 is a plan view on a very small scale as compared with the other figures, of an aircraft embodying three units of propulsion of the form as is described re FIGS. 1,2,3,4, , the propulsion units being shown only in diagrammatic representation.

FIG. 4 shows a form of mounting of the various means of a unit such as has been described (and as modified in FIG. 4), but this form operates substantially as that described in connection with FIGS. 1,2,3,. This FIG. 4 form shows the use of four of the turbine jets TJ with two of the air-fan jets FJ, each of these being as described in connection with FIGS. 1,2,3, and supplied similarly with air and fuel and the volatile fluid, but in this case the jet means are mounted part on one side of the extended fuselage tail structure 56 (FIG. 7) and part on the opposite side of the fuselage tail structure 56, this being substantially at the extreme rearward end of the aircraft structure (FIG. 7). The aircraft structure has the fuselage cabin and pilot structure 57, attached fixed wings of double-delta type 58, vertical support 59 for a tail wing (not shown) and aelerons and elevons as may be necessary. The type of main wing used may be as found desirable in a particular construction and design, and that may be of the swing type in some constructions, and in any case, it will be near that in lift capacity for sustentation at the very highest speed of which the designed aircraft is capable. Dependence will be placed on the lift capacity of the units which have been above-described for the aircraft to supply lift capacity additional to the wing lift capacity, such as may be necessary for the contemplated landing and takeoff speeds of the aircraft and its designed use, as for instance on aircraft carriers, short takeoff air fields or ports. The propulsion jet units described preferably are the form of FIG. 4 on the fuselage tail structure and the form shown by FIGS. 1,2,3, on the forwardly extended spars 60, this being a triangular lift capacity so that there may be proper balance maintenance for the aircraft in slow or high speed.

The general operation is now described. An aircraft embodying propulsion jets or units such as have been described, preferably will have at least three of such units, and preferably stationed on the aircraft as in FIG. 7, where there are two of the units as in FIGS. 1,2,3, and one as in FIG. 4. The aircraft will have the fluid supply and fuel supply, and starting means. For takeoff, the turbine jets TJ each will have its turbine jet engines started in rotation of its rotors and thereby air streams will pass through the jets, and fuel will be supplied for combustion in the combustion chambers of each TJ unit, fuel at first being supplied in considerable volume to provide preheating for the shell spaces 30 of all TJ units whereby the volatile fluid being pumped from reservoir 52 to shell spaces 30 is heated to the degree to provide vaporization of the volatile fluid as it passes through the ports 39 to interior of mounting shaft means 21 and thereby to the turbine casings and inlet chambers of all turbines 11-12 of air-fan jets FJ.

When there is sufficient volume of evaporated volatile fluid and the rate of flow of air for combustion is sufficient, the aircraft may be permitted to move forwardly and attain a necessary speed of acceleration, the air-fan units FJ being at first directed to eject rearwardly to thereby aid in acceleration. When a sufficient speed is attained the air-fan jets FJ will be by the pilots control rotated on their mounting shaft means 21 so jets issuing from units FJ will be directed vertically downwardly for lift aid, the aircraft would then rise for takeoff and forward acceleration would rapidly increase speed to a normal travel speed near sonic or supersonic speed so that elevation is rapidly attained to reach the height for travel course which may be most efficient for travel. As soon as an elevation suitable for speed increase is attained (to clear all obstructions) the pilot may by his control of motors operating mounting shaft means 21 of all units cause the air-fan jets FJ to be directed again to the rearward direction thereby to aid in speed acceleration of the aircraft for normal or cruising travel speed. Thus when sufficient elevation of the aircraft is attained, the aircraft is propelled forwardly by two types of force with the total energy of the two forces. One force is the jet ejection reactive force of all the turbine jet tubes TJ by the heated combustion streams issuing for ejection in the rearward direction to thereby propel the aircraft in the forward direction. The other force is that of the airstreams propelled by the air-fans 8 of units FJ, this force being procured by the action of the flow of the volatile fluid through the turbines 11-12 of units FJ to drive the air-fans 8 of units FJ at very high speed, the turbines being driven for rotation by the force of the expanding volatile fluid in the turbine casings 12 and their turbine rotors.

Travel may be continued with all jets directed rearwardly of the direction of air flight, until destination is reached, and thereupon the pilot may procure the reverse procedure for landing, by first reducing travel speed by reduction of fuel supply to the combustion chambers of units TJ, and secondly by his control of motors 38a and rotation of air-fan jets FJ to the position of direct downward projection, or a partial rotation, as desired, and thirdly by then permitting sufficient fuel combustion, as necessary to provide sufficient energy for the downwardly ejecting units FJ. Landing on a selected landing port or carrier may then be made.

For simplicity in the drawings, such means as automatic fluid pressure release (safety valves) and such additional control means as flow stoppage valves for the volatile fluid may be added but is not shown. Preferably the most simple permissible construction is used. Conduits for electric control lines and conduits for fuel and volatile fluid flow are formed in the supporting structure for the propulsion units and in the fuselage structure 56–57.

The condenser means (FIG. 7) may be located in the fuselage or wing structures and the condenser may be one to use airflow from the aircraft's ventilation air system to cool the volatile fluid as it is received from the exhaust of the turbines of units FJ. Any type of condenser apparatus may be used, such as refrigeration apparatus, or flow of ambient air (where or at speeds permissible).

The economy of the use of fuel may be varied somewhat according to the type of construction of the aircraft, according to the designed capacity of fixed wing or other sustentation system, and may be varied according to the proportioning of fuel flow and volatile fluid flow. The proportioning of such flows may be different in different constructions and according to the objectives in any particular case. The proportioning may achieve increased economy over use of fuel in accepted designs, for the reason that the heat produced may be more efficient in propulsive production, since heat is applied for evaporization of volatile fluid for air-fan propulsion in addition to the combustion jet propulsion, the latter providing also its considerable share of propulsive power and energy by jet ejection.

Referring to the form which is shown in FIGS. 5 and 6, this form is as to the air-fan jets FJ similar in all respects to the above-described first form, but this form differs first in that there is one generator casing or shell 61 in which the heat producing combustion jets are cased or mounted; and differs secondly in that the heat producing combustion jets are chiefly ramjets instead of turbine gas jets, there being included four ramjets designated RJ and there being also included one turbine jet TJ. The turbine jet TJ is a gas fluid jet ejection member having air intake and gas discharge and turbine compressor and turbine rotor. This turbine jet TJ supplies pressurized air from some point of its compression stages at a suitable pressure, through the air pipes 62 and the branches thereof denoted 63 to air nozzles in the ramjets air intake but not materially obstructing air intake from ambient air by the ramjet air intakes. The nozzles for air injection to the ramjets are designated 64 and serve to induct atmospheric air directly to the air intakes of the ramjets before the associated aircraft attains any travel motion at its takeoff port. When travel speed is attained air introduction to the ramjets RJ is as is customary in ramjet means by compression of encountered atmospheric air as the air intake of the ramjet moves forwardly at high speed.

Each ramjet RJ is supplied with fuel for combustion by fuel nozzles 65 the fuel pumps designated 66, operated by electric or other means 67 supplying fuel for combustion to the combustion chamber of each ramjet RJ near the forward end of the ramjet tube. Each ramjet RJ discharges combustion gases at considerable pressure and having still considerable high heat by rearward discharges 68. The motors 67 are controllable variable speed motors so that thereby fuel supply to the combustion chambers of the ramjets RJ may be variable in supply according to demand for combustion heat and gas ejection pressure.

The shell 61 may otherwise be called volatile fluid generator 61. It is a casing which provides adequate support for the ramjets RJ and turbojet TJ and also for the mounting shaft 21 of the air-fan jets FJ, and the mounting shaft 21 supplies vaporized and pressurized volatile fluid as in the first form described to the turbines 11–12 of the fanjets FJ the vaporized volatile fluid being received through ports 39 in mounting shaft 21 from the enclosed upper space—generated gas space—(volatile fluid) which accumulates in the forward end of the space within the shell 61. The said generator space receives liquid volatile fluid. It may be noted here that in this device the designated volatile fluid may include as well any suitable gaseous fluid, this being pumped by the pumping means for circulation. The mounting shaft 21 (FIGS. 5,6,) is rotatable by the motor means 38a and gear means 70, this driving means being also a controllable driving means, reversible and speed variable. The casing or shell 61 is mounted and secured by any means on the or near the tail end of the fuselage this tail end denoted 56. This form of the device is prepared for the aircraft's takeoff by initiating rotation of the turbine rotor means of the turbine jet TJ which delivers some pressurized air, which serves to inject other further supply of air from atmosphere to the combustion chambers of the ramjets RJ whereby there is combustion in the ramjets RJ and the volatile fluid is heated in the shell 61 and the volatile fluid is vaporized or heat expanded and pressurized so that air-fan jets FJ will, as in the first form described, provide propulsion energy by the jets from the air-fans FJ, Thus propulsion for takeoff is provided in part by the ramjets RJ, in part by the turbine jet TJ and in large part also by the air-fan jets FJ. As speed of travel increases the ramjets exert increasing jet ejection propulsion. The air-fan jets FJ in this form are used as in the first-described form to provide lift capacity for the aircraft by positioning the units FJ to provide downward jet ejection for lift energy.

It should be noted that the air-fan jet FJ means and system may be used with any form of heat provision for evaporation of a volatile fluid which may be utilized in the provision of working energy by a turbine means as described (of any form) to drive an air-fan means for jet propulsion, whether for travel propulsion or lift propulsion in the manner as described. It should be particularly noted that I intend that any gaseous fluid as air, carbon dioxide, Freon gas, nitrogen, oxygen, butane or any gas suitable as a working fluid may be used as a gas throughout the system driving the air-fans, the application of heat and expansion and contraction being utilizable for production of the turbine rotor driving energy.

In use of my device with a fluid in the air-fan drive system, which is gaseous and remains gaseous the condenser may be eliminated and the fluid pump means 41 which delivers fluid to the spaces 30 may be enlarged in proportion and used to pump the gaseous fluid under high pressure to the spaces 30, and in use of such gaseous fluid (which may be air) the fluid may be circulated in the system or it may be simply discharged from the air-fan turbine 11–12 into the air-fan airstream ejected rearwardly.

I contemplate that the shell space or generator space 30 may denote and include any type of generator space surrounding the ejection conduit of the unit TJ and the combustion space jacket, and this generator space may be formed in tubing coiled around the ejection conduit or it may be contained in any plural number of tubular sections which may comprise the jacket of the ejection conduit. In other words the generator space may be formed in any manner or by any combination of sections which will jacket the ejection conduit and which will absorb heat from the combustion gases in the jet conduit and combustion space of a unit TJ. The form of ramjet propulsion may be that as is well known for ramjets and may have such a proportion of size and capacity as may be desirable for any particular construction.

In the illustrations I have shown no insulation jackets about the exterior surfaces of the generator shells 28, it being contemplated that such use of insulation is well known as a heat conservator in any constructions where it may be advisable and conducive to net efficiency for conservation of heat where it may be applicable.

What I claim is:

1. In propulsion means for aircraft and other vehicles: a pair of air jet impulse production means each having a jet duct having air intake and jet discharge and having intermediately of the air intake and jet air discharge a rotary air impulsion means to induct airflow from the air intake and by the jet duct to the jet air discharge for impulse discharge to atmosphere and having a turbine rotor means with driving transmission to the rotary air impulsion means and having a casing within which the turbine rotor means rotates and having flow connection with fluid pressure generation means for flow of pressurized working fluid, the fluid pressure generation means having fluid container with working fluid supply thereto and discharge by said connection and having combustion chamber means and air and fuel supply thereto; a mounting shaft means mounted rotatably in bearing means therefor formed in a part of the aircraft frame structure; one of said air jet impulse production means mounted at one end of said mounting shaft and the other mounted at the other end of said mounting shaft and each being laterally exteriorly of said part of the said frame structure; the flow by said flow connection from said fluid container being by conduit through the mounting shaft means and thereby to the casing of the turbine rotor means.

2. In propulsion means for aircraft and other vehicles: a pair of air jet impulse production means, each having a jet duct having air intake and jet discharge and having intermediately of the air intake and jet discharge a rotary air impulsion means to induct airflow from the air intake and by the jet duct to the jet air discharge for impulse discharge to atmosphere and having a turbine rotor means with driving transmission to the rotary air impulsion means and having a casing within which the turbine rotor means rotates and having flow connection with fluid pressure generation means for flow of pressurized working fluid, the fluid pressure generation means having fluid container with working fluid supply thereto and discharge by said connection and having combustion chamber means and air and fuel supply thereto; a mounting shaft means mounted rotatably in bearing means therefor formed in a part of the aircraft frame structure; one of said air jet impulse production means mounted at one end of said mounting shaft means and the other mounted at the other end of said mounting shaft means and each being laterally exteriorly of said part of the said frame structure; the flow by said flow connection from said fluid container being by conduit through the mounting shaft means and thereby to the casing of the turbine rotor means; motor means drivably engaged with said mounting shaft means by connecting elements of transmission; and means for control of said last-named motor means to effect change of directional air jet ejection from said air jet impulse production means.

3. In propulsion means for aircraft and other vehicles: a heat exchange means for fluid pressure generation comprising; a jacket container chamber means, combustion chamber means in heat exchange association with the jacket container chamber means to provide heat transfer from combustion gases in the combustion chamber means to working fluid in the working fluid pressure generator; means supplying working fluid into the jacket container chamber means; means supplying fuel to the combustion chamber means and supplying air therewith for combustion and heat production; and in combination air jet impulse production means including a jet ejection duct having air intake and jet air discharge and having intermediately of the intake and jet air discharge a rotary air impulsion means to induct air flow into the air intake and by the jet duct to the jet air discharge for impulsion discharge to atmosphere; a turbine rotor means having driving transmission to the rotary air impulsion means and having a casing within which the turbine rotor means rotates and having flow connection with the container chamber means of the fluid pressure generator for flow of pressurized fluid therefrom to the turbine rotor means for driving thereof and discharge therefrom; the said air jet impulse production means having pivot mounting by a pivot shaft on a part of the frame means of an aircraft to be rotatable as a unit on an axis which is horizontal and is transversely of a longitudinal plane through said frame means; the flow by said flow connection from said container chamber means being by conduit through the mounting pivot shaft and thereby to the casing of the turbine rotor means; such rotation as a unit providing direction of the air impulsion either for forward propulsion of the aircraft or alternatively for direction of flow of air jet impulsion discharge in a direction other than the direction for forward propulsion of the aircraft; control operation of the mounting pivot shaft and air jet impulse production means being comprised of gear means thereon and cooperative gear means coupled for operation with a controllable reversible control motor means.

4. A propulsion unit for aircraft and comprising: a longitudinal support structure forming a basic support, at least one jet casing fixed on and formed in the support structure and having turbine rotor means driving compressor rotor means to propel air from intake means through combustion chamber means to ejection jet discharge and having fuel supply and injection to the combustion chamber means; a pivot bearing formed in the support structure and having axis in a plane transversely of the support structure and substantially at right angles to the axis of the fixed jet casing; a pivot shaft rotatably mounted in the pivot bearing and bearing fixed therewith a pair of air duct casings one at each end of the pivot shaft to be rotatable in unison with the pivot shaft; each air duct casing having formed therewith a work fluid casing each having turbine rotor with driving connection to an air propulsion rotor in the associated duct casing; work fluid container jacket enclosing the propulsion jet nozzle through which hot gases flow to ejection discharge; work fluid conduit from said container jacket, through said pivot shaft and to the work fluid casing to drive the turbine rotor therein and to discharge to condenser means; controllable and reversible control motor means drivably operative in connection with said pivot shaft for limited rotation of said duct casings for direction change of the air propulsion therefrom.

5. In propulsion means for aircraft: a plural number of jet propulsion ducts, each duct having duct walls forming the duct, each duct having forwardly directed air intake and rearwardly directed jet propulsion discharge, each duct having combustion chamber through which there is flow from the air intake to the jet propulsion discharge and ejection therefrom for propulsion, each duct having means for fuel supply thereto; a jacket about the plural number of jet propulsion ducts to form work fluid container space, the jacket forming support structure for walls of each of the ducts and by which the ducts are supported on an aircraft structure; means delivering to one end of the work fluid container space a pressurized work fluid for heat absorption from combustion gases flowing through the ducts; a work fluid discharge from the work fluid container space; and in combination, a supplemental turbine rotor means which has transmission drive to a supplemental air propulsion rotor means which is rotatable in supplemental air propulsion duct means to induct atmospheric air from forwardly and discharge air rearwardly; the supplemental turbine rotor means having intake to it by connection with discharge from the work fluid container space; the supplemental turbine rotor means having outlet therefrom for work fluid.

6. In propulsion means for aircraft: a work fluid casing jacket having upper wall and lower wall as enclosure; a plural number of elongated duct casings each having a length at least as that of the distance from the forward end of the casing jacket to the rearward end of said casing jacket and each having open air intake at its forward end and rearward jet discharge at its rearward end and each having combustion chamber with fuel supply thereto intermediately of the air intake and jet discharge and duct flow therethrough; the said casing jacket having at its forward end secure attachment to and closure with the walls of the duct casings at their forward ends and each having a secure attachment to and closure with the walls of the said duct casings at their rearward ends, there being thereby formed a contained work fluid flow space and there being thereby formed support structure for support of the duct casings in their longitudinal location in the casing jacket and on an aircraft structure; pump-compressor means delivering work fluid under pressure into said contained work fluid flow space; supplemental turbine rotor means as a work engine connected to and to receive driving work fluid under pressure from the work fluid casing jacket, and a rotative air propulsion rotor means having driven connection with the supplemental turbine rotor means to be driven thereby.

7. The means as defined in claim 6 and in combination: the air propulsion rotor means having mounting for rotation in supplemental duct casing means, the air propulsion rotor means and the supplemental duct casing means having pivotal mounting by a pivot shaft in the support structure for variable change of direction of jet propulsion by said supplemental propulsion air propulsion rotor means and supplemental duct casing means.

* * * * *